(12) United States Patent
Wang et al.

(10) Patent No.: US 9,900,857 B2
(45) Date of Patent: Feb. 20, 2018

(54) METHOD AND APPARATUS FOR MAINTAINING UPLINK SYNCHRONIZATION AND REDUCING BATTERY POWER CONSUMPTION

(71) Applicant: INTERDIGITAL TECHNOLOGY CORPORATION, Wilmington, DE (US)

(72) Inventors: Jin Wang, Princeton, NJ (US); John S. Chen, Ann Arbor Township, MI (US); Mohammed Sammour, Alrabieh-Amman (JO); Stephen E. Terry, Northport, NY (US); Arty Chandra, Manhasset Hills, NY (US); Guodong Zhang, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 93 days.

(21) Appl. No.: 14/848,507

(22) Filed: Sep. 9, 2015

(65) Prior Publication Data

US 2015/0382317 A1    Dec. 31, 2015

Related U.S. Application Data

(63) Continuation of application No. 11/689,771, filed on Mar. 22, 2007, now Pat. No. 9,167,546.
(Continued)

(51) Int. Cl.
*H04W 56/00* (2009.01)
*H04J 11/00* (2006.01)
(Continued)

(52) U.S. Cl.
CPC ..... *H04W 56/0045* (2013.01); *H04J 11/0069* (2013.01); *H04W 52/0216* (2013.01);
(Continued)

(58) Field of Classification Search
None
See application file for complete search history.

(56) References Cited

U.S. PATENT DOCUMENTS 5,373,506 A    12/1994    Tayloe et al.
5,636,243 A    6/1997     Tanaka
(Continued)

FOREIGN PATENT DOCUMENTS

CN    1379963 A    11/2002
CN    1486579 A     3/2004
(Continued)

OTHER PUBLICATIONS

3rd Generation Partnership Project (3GPP), R1-060591, "Uplink DPCCH Gating-Link Level Performance", Nokia, 3GPP TSG-RAN WG1 Meeting #44, Denver, USA, Feb. 13-17, 2006, 4 pages.
(Continued)

*Primary Examiner* — Anh Ngoc Nguyen
(74) *Attorney, Agent, or Firm* — Condo Roccia Koptiw LLP

(57) ABSTRACT

A Node-B sends a polling message to a wireless transmit/receive unit (WTRU). The WTRU sends an uplink synchronization burst in response to the polling message without contention. The Node-B estimates an uplink timing shift based on the synchronization burst and sends an uplink timing adjustment command to the WTRU. The WTRU then adjusts uplink timing based on the uplink timing adjustment command. Alternatively, the Node-B may send a scheduling message for uplink synchronization to the WTRU. The WTRU may send a synchronization burst based on the scheduling message. Alternatively, the WTRU may perform contention-based uplink synchronization after receiving a synchronization request from the Node-B. The WTRU may enter an idle state instead of performing a handover to a new cell when the WTRU moves to the new cell. A discontinuous
(Continued)

reception (DRX) interval for the WTRU may be set based on activity of the WTRU.

12 Claims, 2 Drawing Sheets

Related U.S. Application Data

(60) Provisional application No. 60/785,491, filed on Mar. 24, 2006.

(51) Int. Cl.
*H04W 52/02* (2009.01)
*H04W 72/04* (2009.01)
*H04W 92/10* (2009.01)

(52) U.S. Cl.
CPC ........ *H04W 72/0413* (2013.01); *H04W 92/10* (2013.01); *Y02B 60/50* (2013.01); *Y02D 70/00* (2018.01); *Y02D 70/1244* (2018.01); *Y02D 70/1262* (2018.01); *Y02D 70/142* (2018.01); *Y02D 70/144* (2018.01); *Y02D 70/24* (2018.01)

(56) References Cited

U.S. PATENT DOCUMENTS

| | | |
|---|---|---|
| 5,862,452 A | 1/1999 | Cudak et al. |
| 6,088,337 A | 7/2000 | Eastmond et al. |
| 6,501,949 B1 | 12/2002 | Singleton |
| 6,625,281 B1 | 9/2003 | Bernard |
| 6,807,165 B2 | 10/2004 | Belcea |
| 7,133,702 B2 | 11/2006 | Amerga et al. |
| 7,286,563 B2 | 10/2007 | Chang et al. |
| 7,298,716 B2 | 11/2007 | Abraham et al. |
| 7,336,638 B2 | 2/2008 | Cheng et al. |
| 7,505,795 B1 | 3/2009 | Lim et al. |
| 7,706,350 B2 | 4/2010 | Gorokhov et al. |
| 7,872,986 B2 | 1/2011 | Chun et al. |
| 7,916,675 B2 | 3/2011 | Dalsgaard et al. |
| 8,145,135 B2 | 3/2012 | Dalsgaard et al. |
| 8,238,260 B2 | 8/2012 | Terry et al. |
| 2002/0058482 A1 | 5/2002 | Agin et al. |
| 2003/0202500 A1* | 10/2003 | Ha .................. H04L 1/0003 370/342 |
| 2003/0210668 A1 | 11/2003 | Malladi et al. |
| 2004/0085926 A1 | 5/2004 | Hwang et al. |
| 2004/0087320 A1 | 5/2004 | Kim et al. |
| 2004/0100940 A1 | 5/2004 | Kuure et al. |
| 2004/0147271 A1 | 7/2004 | Billon et al. |
| 2004/0185918 A1* | 9/2004 | Fan .................. H04W 52/0248 455/574 |
| 2004/0198411 A1 | 10/2004 | Cheng et al. |
| 2004/0229659 A1 | 11/2004 | Boos et al. |
| 2005/0032555 A1 | 2/2005 | Jami et al. |
| 2005/0049012 A1 | 3/2005 | Chang et al. |
| 2005/0117530 A1 | 6/2005 | Abraham et al. |
| 2005/0148348 A1 | 7/2005 | Cramby et al. |
| 2005/0153751 A1 | 7/2005 | Bultan et al. |
| 2005/0176474 A1 | 8/2005 | Lee et al. |
| 2005/0201474 A1 | 9/2005 | Cho et al. |
| 2005/0207385 A1 | 9/2005 | Gorokhov et al. |
| 2005/0221833 A1* | 10/2005 | Granzow .............. H04W 52/50 455/450 |
| 2005/0232271 A1* | 10/2005 | Kettunen .............. H04L 12/189 370/390 |
| 2006/0019641 A1* | 1/2006 | Vayanos ............. H04W 12/1881 455/414.1 |
| 2006/0056342 A1* | 3/2006 | Lee ..................... H04W 68/12 370/328 |
| 2006/0195576 A1 | 8/2006 | Rinne et al. |
| 2006/0198340 A1* | 9/2006 | Murata ................ H04L 1/0026 370/331 |
| 2006/0258383 A1 | 11/2006 | Jiang et al. |
| 2006/0262739 A1* | 11/2006 | Ramirez ............... H04W 88/06 370/311 |
| 2007/0133479 A1 | 6/2007 | Montojo et al. |
| 2007/0140386 A1 | 6/2007 | Howard |
| 2007/0218835 A1 | 9/2007 | Hindelang et al. |
| 2007/0291673 A1 | 12/2007 | Demirhan et al. |
| 2007/0291729 A1 | 12/2007 | Dalsgaard et al. |
| 2008/0046132 A1 | 2/2008 | Dalsgaard et al. |
| 2008/0167089 A1 | 7/2008 | Suzuki et al. |
| 2008/0225772 A1 | 9/2008 | Xu |
| 2008/0232284 A1 | 9/2008 | Dalsgaard et al. |
| 2008/0232310 A1 | 9/2008 | Xu |
| 2008/0293426 A1 | 11/2008 | Kim et al. |
| 2009/0268689 A1 | 10/2009 | Fu et al. |

FOREIGN PATENT DOCUMENTS

| | | |
|---|---|---|
| CN | 1549612 A | 11/2004 |
| EP | 0536099 A1 | 4/1993 |
| EP | 1499144 A1 | 1/2005 |
| EP | 1511337 A1 | 3/2005 |
| EP | 1613107 A2 | 1/2006 |
| GB | 2328588 A | 2/1999 |
| JP | 2005-260906 A | 9/2005 |
| RU | 2120181 C1 | 10/1998 |
| RU | 2173502 C2 | 9/2001 |
| RU | 2216100 C2 | 11/2003 |
| RU | 2242092 C2 | 12/2004 |
| RU | 2262196 C2 | 10/2005 |
| RU | 2263400 C2 | 10/2005 |
| TW | 200404466 A | 3/2004 |
| TW | 200610298 A | 3/2006 |
| TW | I361586 B | 4/2012 |
| WO | WO 1997/041658 A1 | 11/1997 |
| WO | WO 2000/022837 A2 | 4/2000 |
| WO | WO 2001/024411 A1 | 4/2001 |
| WO | WO 2001/041374 A1 | 6/2001 |
| WO | WO 2001/060103 A1 | 8/2001 |
| WO | WO 2002/056627 A1 | 7/2002 |
| WO | WO 2004/077919 A2 | 9/2004 |
| WO | WO 2004/102833 A1 | 11/2004 |
| WO | WO 2005/048506 A2 | 5/2005 |
| WO | WO 2005/067172 A1 | 7/2005 |
| WO | WO 2005/117299 A1 | 12/2005 |
| WO | WO 2006/039812 A1 | 4/2006 |
| WO | WO 2006/118411 A2 | 11/2006 |
| WO | WO 2006/135187 A2 | 12/2006 |
| WO | WO 2007/149732 A1 | 12/2007 |

OTHER PUBLICATIONS

3rd Generation Partnership Project (3GPP), R2-060591, "MAC Procedures for DRX and DTX in LTE_Active", Ericsson, TSG-RAN WGx Meeting #51, Denver, USA, Feb. 13-17, 2006, pp. 1-4.
3rd Generation Partnership Project (3GPP), R2-062803, "Periodic Resource Assignment for Uplink Synchronization Transmission in LTE Active Mode", InterDigital Communications Corporation, 3GPP TSG RAN WG2 #55, Seoul, Korea, Oct. 9-13, 2006, 4 pages.
3rd Generation Partnership Project (3GPP), R2-070265, "DRX Scheme", LG Electronics, 3GPP TSG-RAN WG2 #56bis, Sorrento, Italy, Jan. 15-19, 2007, pp. 1-4.
3rd Generation Partnership Project (3GPP), R2-070279, "Views on DRX/DTX Control in LTE", NTT DoCoMo, Inc., 3GPP TSG RAN WG2 #56bis, Sorrento, Italy, Jan. 15-19, 2007, 3 pages.
3rd Generation Partnership Project (3GPP), R2-070896, "Draft2 Minutes of the 56bis TSG-RAN WG2 Meeting", 3GPP Support Team, TSG-RAN WG2 meeting #57, Sorrento, Italy, Jan. 15-19, 2007, pp. 1-82.
3rd Generation Partnership Project (3GPP), Tdoc R1-060503, "Uplink Timing Control Signal Resource Allocation", ZTE, 3GPP TSG RAN WG1 #44, Denver, USA, Feb. 13-17, 2006, pp. 1-3.

(56) References Cited

OTHER PUBLICATIONS

3rd Generation Partnership Project (3GPP), TR 25.814 V1.2.1, "Technical Specification Group Radio Access Network, Physical Layer Aspects for Evolved UTRA (Release 7)", Feb. 2006, pp. 1-84.
3rd Generation Partnership Project (3GPP), TR 25.814 V7.1.0, "Technical Specification Group Radio Access Network, Physical Layer Aspects for Evolved Universal Terrestrial Radio Access (UTRA) (Release 7)", Sep. 2006, pp. 1-132.
3rd Generation Partnership Project (3GPP), TR 25.912 V0.0.4, "Technical Specification Group Radio Access Network, Feasibility Study for Evolved UTRA and UTRAN (Release 7)", Mar. 2006, pp. 1-14.
3rd Generation Partnership Project (3GPP), TR 25.912 V7.1.0, "Technical Specification Group Radio Access Network, Feasibility Study for Evolved Universal Terrestrial Radio Access (UTRA) and Universal Terrestrial Radio Access Network (UTRAN) (Release 7)", Sep. 2006, pp. 1-57.
3rd Generation Partnership Project (3GPP), TS 25.321 V7.3.0, "Technical Specification Group Radio Access Network, Medium Access Control (MAC) Protocol Specification (Release 7)", Dec. 2006, pp. 1-113.
3rd Generation Partnership Project (3GPP), TS 25.331 V7.3.0, "Technical Specification Group Radio Access Network, Radio Resource Control (RRC), Protocol Specification (Release 7)", Dec. 2006, pp. 1-1316.
3rd Generation Partnership Project (3GPP), TS 25.331 V8.1.0, "Technical Specification Group Radio Access Network, Radio Resource Control (RRC), Protocol Specification (Release 8)", Dec. 2007, pp. 1-1471.
3rd Generation Partnership Project (3GPP), TS 36.300 V0.3.1, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Nov. 2006, pp. 1-72.
3rd Generation Partnership Project (3GPP), TS 36.300 V1.0.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Mar. 2007, pp. 1-82.
3rd Generation Partnership Project (3GPP), TS 36.300 V8.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2007, pp. 1-121.
3rd Generation Partnership Project (3GPP), TSGR1#14(00)0903, "Uplink Synchronous Transmission Scheme (USTS)", SK Telecom, TSG-RAN Working Group 1 Meeting #14 Oulu, Finland, Jul. 4-7, 2000, 5 pages.
3rd Generation Partnership Project (3GPP), TSGR1#7(99) c35, "Uplink Synchronization Transmission Scheme", SK Telecom, TSG-RAN Working Group 1 Meeting #7, Hannover, Germany, Aug. 30-Sep. 3, 1999, pp. 1-3.
$3^{rd}$ Generation Partnership Project (3GPP), R2-060004, "Adaptive UE Feedback Channel for Downlink Scheduling Decision in LTE", Alcatel, 3GPP TSG-RAN WG 2 Meeting #50, Jan. 9-13, 2006, pp. 1-4.
$3^{rd}$ Generation Partnership Project (3GPP), R2-0601006, "UL Timing Sync Procedure", Samsung, 3GPP TSG RAN2, Meeting #52, Athens, Greece, Mar. 27-31, 2006, 4 pages.
$3^{rd}$ Generation Partnership Project (3GPP), R2-060888, "DRX and DTX Operation in LTE_Active", Panasonic, 3GPP TSG-RAN WG2, Meeting #52, Athena, Greece, Mar. 2731, 2006, 3 pages.
$3^{rd}$ Generation Partnership Project (3GPP), Tdoc R2-060967, "DRX and DTX in LTE_Active", Ericsson, TSG-RAN WG2, Meeting #52, Athens, Greece, Mar. 27-31, 2006, 5 pages.
$3^{rd}$ Generation Partnership Project (3GPP), R2-061002, "UE state transition in LTE_Active", LG Electronics Inc., 3GPP TSG-RAN WG2, Meeting #52, Athens, Greece, Mar. 27-31, 2006, 4 pages.
$3^{rd}$ Generation Partnership Project (3GPP), TR 25.813 V0.6.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", Mar. 2006, 26 pages.

* cited by examiner

METHOD AND APPARATUS FOR MAINTAINING UPLINK SYNCHRONIZATION AND REDUCING BATTERY POWER CONSUMPTION

CROSS REFERENCE TO RELATED APPLICATION

This application is a continuation of U.S. Non-Provisional application Ser. No. 11/689,771, which was filed Mar. 22, 2007, which claims the benefit of U.S. Provisional Application No. 60/785,491 filed Mar. 24, 2006, which is incorporated by reference as if fully set forth.

FIELD OF INVENTION

The present invention is related to wireless communication systems. More particularly, the present invention is related to a method and apparatus for maintaining uplink synchronization and reducing battery power consumption of a wireless transmit/receive unit (WTRU).

BACKGROUND

In a conventional third generation partnership project (3GPP) system, there are four non-idle radio resource control (RRC) states roughly corresponding to four levels of WTRU activity: a dedicated channel (DCH) cell level (Cell_DCH) state, a forward access channel (FACH) cell level (Cell_FACH) state, a paging channel (PCH) cell level (Cell_PCH) state, and a universal terrestrial radio access network (UTRAN) registration area (URA) PCH (URA_PCH) state. In a Cell_DCH state, a WTRU has a dedicated physical channel for data transport. In a Cell_FACH state, no dedicated channel is allocated to the WTRU, but the WTRU may use a random access channel (RACH) and a FACH channel for conveying and receiving signaling as well as user plane data. It is not efficient to send a large amount of user plane data in the Cell_FACH state. A Cell_PCH state reduces battery consumption by only listening to a PCH in a discontinuous reception (DRX) mode. As with the Cell_DCH and Cell_FACH states, the location of a WTRU in the Cell_PCH state is known at the cell level. A WTRU in the Cell_PCH state temporarily enters a Cell_FACH state when it relocates to a new cell in order to communicate its new location information. A URA_PCH state is similar to the Cell_PCH state, except that in the URA_PCH state the network is only informed when the WTRU moves to a new URA. When a WTRU changes cells, the WTRU generally stays in the same state. Currently, handovers in the Cell_DCH state are network-directed.

A WTRU that is in an active state has a non-access stratum (NAS) connectivity so that the WTRU may communicate to nodes in a core network. A WTRU in an active state also has an access stratum (AS) connectivity such that a radio bearer configuration, (e.g., WTRU capability exchange, ciphering, or the like), has been completed for the WTRU.

A WTRU in an idle state consumes less power and resources than a WTRU in a low-power active state. One important characteristic of a WTRU in an idle state is that the WTRU does not have to participate in an active mode handover. In other words, when a WTRU in an idle state moves from one cell to another, the WTRU does not configure radio bearers with the new cell if the WTRU remains in an idle state.

One of the goals in a next generation wireless communication system is maintaining an "always on" connectivity. However, for a battery-powered WTRU, battery power consumption is an issue. The "always on" connectivity is a desirable feature, but this tends to shorten the battery life.

Currently in 3GPP, a WTRU maintains uplink synchronization whenever it has a dedicated channel to a base station. The WTRU always maintains uplink synchronization in a Cell_DCH state. The WTRU also resynchronizes its uplink any time it has a new set of dedicated channels disjoint from its prior set. Maintaining uplink synchronization, (conventionally via RACH transmissions), is one of the sources for consuming the battery power of the WTRU.

Therefore, it would be desirable to provide a scheme for maintaining uplink synchronization efficiently and reducing battery power consumption while the WTRU is in an active state.

SUMMARY

The present invention is related to a method and apparatus for maintaining uplink synchronization and reducing battery power consumption of a WTRU. A Node-B sends a polling message to a WTRU. The WTRU sends an uplink synchronization burst in response to the polling message without contention. The Node-B estimates an uplink timing shift based on the uplink synchronization burst and sends an uplink timing adjustment command to the WTRU without contention. The WTRU then adjusts uplink timing based on the uplink timing adjustment command. Alternatively, the Node-B may send a scheduling message for uplink synchronization to the WTRU. The WTRU may send the uplink synchronization burst based on the scheduling message. Alternatively, the WTRU may perform contention-based uplink synchronization after receiving a synchronization request from the Node-B. The WTRU may enter an idle state instead of performing a handover to a new cell when the WTRU moves to the new cell. A DRX interval for the WTRU may be set based on activity of the WTRU.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station (STA), a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The present invention is applicable to any wireless communication systems including, but not limited to, wideband code division multiple access (WCDMA) and long term evolution (LTE) of 3GPP cellular networks beyond 3GPP Release 7.

Figure 1:
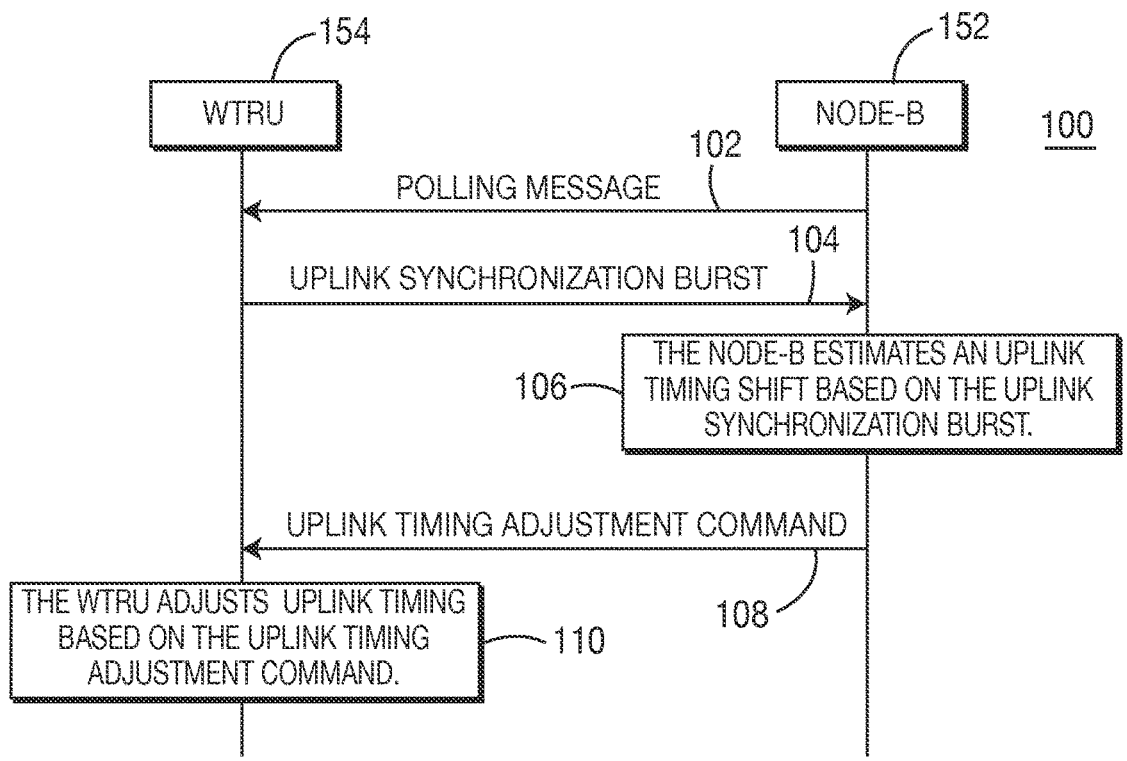
FIG. 1 is a signaling diagram of a process for maintaining uplink synchronization using a contention free procedure in accordance with one embodiment of the present invention.

FIG. 1 is a signaling diagram of a process 100 for maintaining uplink synchronization using a contention-free procedure in accordance with one embodiment of the present invention. For uplink synchronization, a Node-B 152 sends a polling message to a WTRU 154 to request transmission of an uplink synchronization burst (step 102). The WTRU 154 may receive the polling message either during registration or via broadcasting after registration. The polling message indicates a specific time, (e.g., a system frame number or transmission time interval (TTI)), and/or resource for sending the uplink synchronization burst so that the specific WTRU may send the uplink synchronization burst without contending against other WTRUs. In response to the polling message, the WTRU 154 sends an uplink synchronization burst based on the parameters, (e.g., a specific time, a resource, or the like), included in the polling message (step 104). The Node-B 152 receives the uplink synchronization burst and estimates an uplink timing shift based on the uplink synchronization burst (step 106). The Node-B 152 sends an uplink timing adjustment command to the WTRU 154 (step 108). The WTRU 154 then adjusts uplink timing based on the uplink timing adjustment command (step 110).

The polling message may include uplink interference information so that the WTRU 154 may use the information in determining uplink transmit power for the uplink synchronization burst. Alternatively, the Node-B 152 may explicitly indicate an uplink transmit power for the uplink synchronization burst. The Node-B 152 may send the polling message via a downlink common control channel granting an access to an uplink shared channel for the uplink synchronization burst.

Alternatively, to save an additional power, the WTRU 154 may enter a DRX mode and wake at predetermined intervals for either paging or uplink shared channel allocation. If the WTRU 154 enters a DRX mode, the Node-B 152 does not need to send the polling messages to the WTRU 154 very often. The network configures a periodicity on how often the Node-B 152 should send the polling message to the WTRU 154. This periodicity information can be sent to the WTRU 154 through a broadcast message. In this way, the WTRU 154 may only wake up at the moment when the polling message is expected. After listening to the polling message and perform the necessary uplink transmissions, the WTRU 154 reenters the DRX mode in order to save the battery power.

The polling message may address several WTRUs containing parameters for several polled WTRUs to send their uplink synchronization bursts. A polling rate may be different for each WTRU. The polling rate may be determined based on the estimated clock drift and/or mobility of the WTRUs. The polling rate may be adaptively changed by either the WTRU 154, (via a request to the Node-B 152), or the Node-B 152. The polling rate may be different for each RRC (or medium access control (MAC)) state of the WTRU 154. The polling rate may increase over time, (e.g., exponentially), as the period of inactivity of the WTRU 154 increases. The Node-B 152 may use the results of the uplink synchronization as one factor in adaptively changing the polling rate for the WTRU 154. An uplink channel allocation for the uplink synchronization burst provided by the polling message may be periodic or may optionally indicate duration of the uplink channel.

Since the WTRU 154 in the active state is already known to the Node-B 152 and the Node-B 152 can uniquely identify the WTRU 154 via the scheduled times for the WTRU 154, the WTRU 154 may omit a cell ID or a WTRU ID, (e.g., a control radio network temporary identity (C-RNTI)), in the uplink synchronization burst. This will reduce an overhead.

Alternatively, the Node-B 152 may include a short, (preferably random), identifier, tag or a sequence number in the polling message, and the WTRU 154 may use the same short identifier, tag or sequence number in the uplink synchronization burst. Since this identifier, tag, or sequence number is smaller than other forms of identification, (e.g., a cell ID or a C-RNTI), the overhead is reduced.

Figure 2:
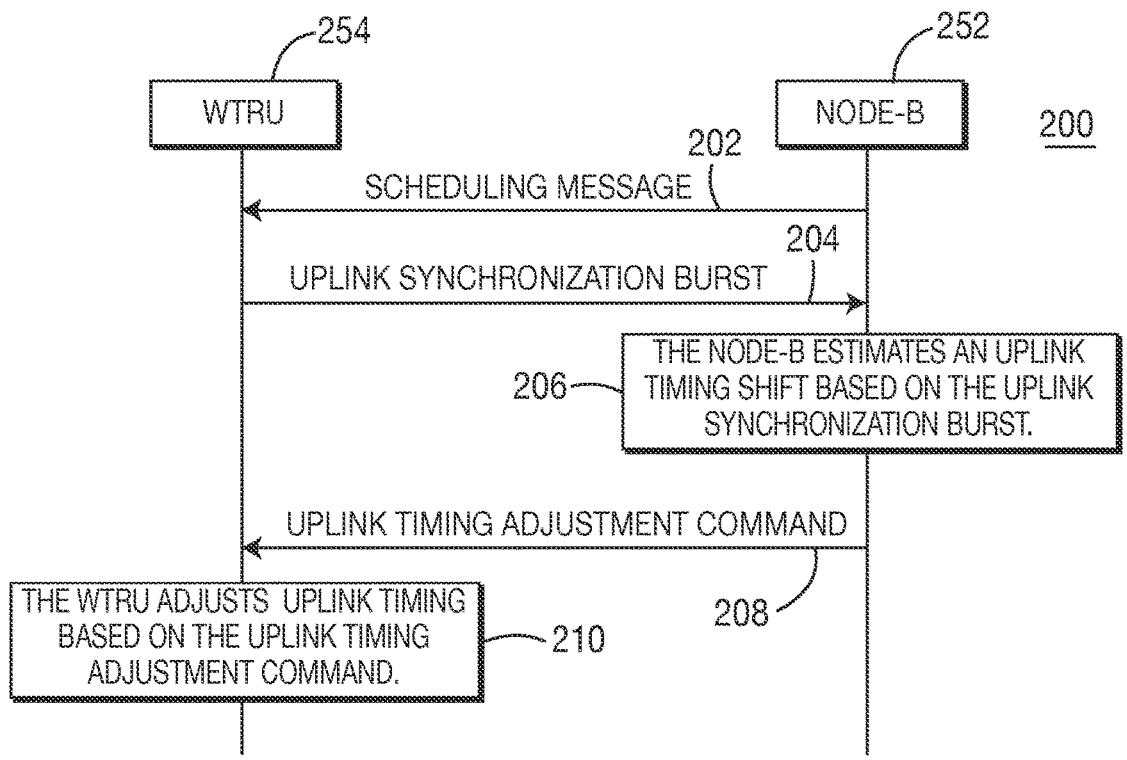
FIG. 2 is a signaling diagram of a process for maintaining uplink synchronization using a contention free procedure in accordance with another embodiment of the present invention.

FIG. 2 is a signaling diagram of a process 200 for maintaining uplink synchronization using a contention-free procedure in accordance with another embodiment of the present invention. A Node-B 252 generates a schedule for uplink synchronization for a WTRU 254 and sends a scheduling message for uplink synchronization to the WTRU 254 (step 202). The scheduling message may include a schedule for several WTRUs. Uplink synchronization is performed at predetermined times using a predetermined resource specified in the scheduling message. The Node-B 252 may signal the resource for uplink synchronization to the WTRU 254 prior to the scheduled synchronization time. The scheduling message may include uplink interference information or uplink transmit power information. The uplink transmit power information may be for a group of WTRUs if they are in a similar situation. Alternatively, the uplink transmit power information may be for each WTRU or may just be used as a reference. The scheduling message may be transmitted via a downlink common control channel granting an access to an uplink shared channel for the synchronization burst.

The WTRU 254 sends an uplink synchronization burst based on the scheduling message (step 204). The WTRU 254 may optionally indicate the next synchronization time in the uplink synchronization burst, (i.e., the synchronization burst payload may include a field indicating the next synchronization time). This synchronization time may be viewed as a recommendation by the Node-B 252, and the Node-B 252 may modify the schedule or the recommendation by sending a signal via a downlink signaling channel, (e.g., a shared control channel). The WTRU 254 may also send a scheduling request informing the amount of data waiting for transmission in the WTRU 254. The WTRU 254 may also send measurement results such as a channel quality indicator (CQI).

The Node-B 252 estimates an uplink timing shift based on the uplink synchronization burst (step 206). The Node-B 252 sends an uplink timing adjustment command to the WTRU 254 (step 208). The WTRU 254 then adjusts uplink timing based on the uplink timing adjustment command (step 210).

Since the WTRU 254 in an active state is already known to the Node-B 252 and the Node-B 252 can uniquely identify the WTRU 254 via the scheduled times for the WTRU 254, the WTRU 254 may omit a cell ID or a WTRU ID, (e.g., a C-RNTI), in the uplink synchronization burst. This will reduce an overhead.

Alternatively, the Node-B 252 may include a short, (preferably random), identifier, tag or a sequence number in the scheduling message, and the WTRU 254 may use the same short identifier, tag or sequence number in the uplink synchronization burst. Since this identifier, tag, or sequence number is smaller than other forms of identification, (e.g., a cell ID or a C-RNTI), the overhead is reduced.

Figure 3:
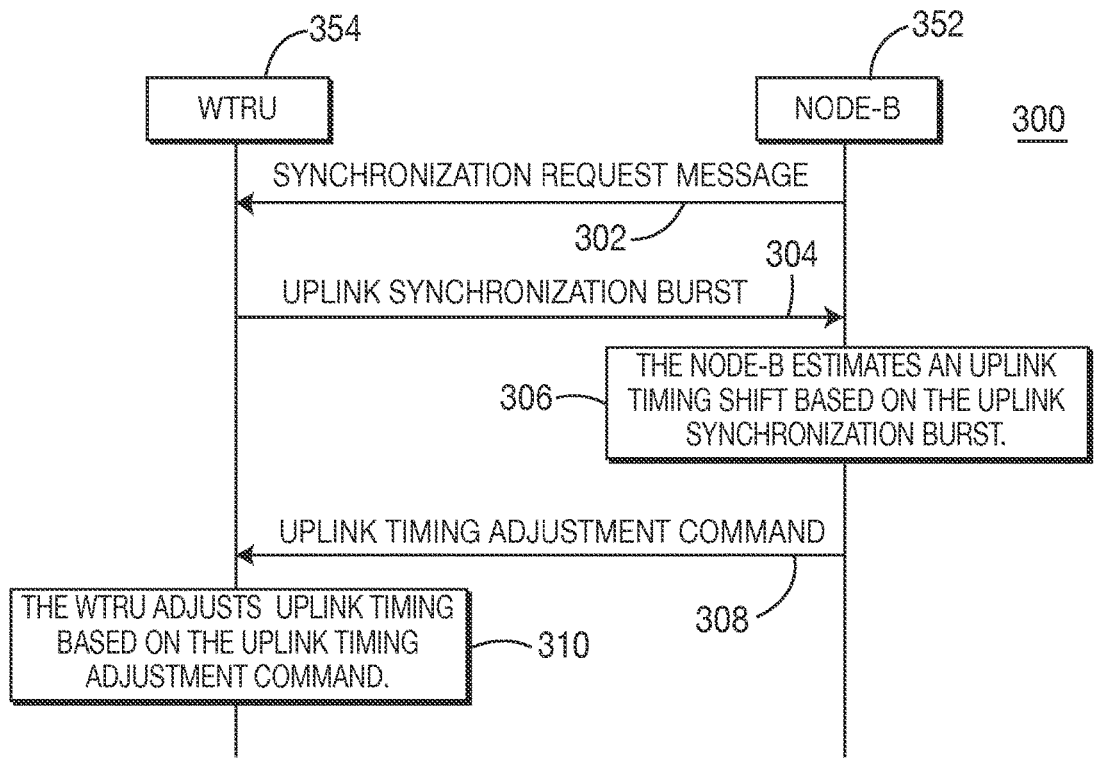
FIG. 3 is a signaling diagram of a process for uplink synchronization using a contention-based procedure in accordance with the present invention.

FIG. 3 is a signaling diagram of a process 300 for uplink synchronization using a contention-based procedure in accordance with the present invention. A Node-B 352 sends a synchronization request message to a WTRU 354 instructing or recommending the WTRU 354 to perform an uplink synchronization procedure during the WTRU 354 is in an active state (step 302). The synchronization request message may address multiple WTRUs. The synchronization request message may include a specific time and/or resource for the WTRU to send the synchronization burst. The synchronization request message may include uplink interference information or uplink transmit power information. The synchronization request message may be transmitted via a downlink common control channel granting an access to an uplink shared channel for the synchronization burst.

In response, the WTRU 354 performs the conventional contention-based procedure for uplink synchronization. The WTRU 354 sends an uplink transmission, (e.g., an RACH preamble), to the Node-B 352, (e.g., via an RACH), using a contention-based mechanism, (e.g., a slotted Aloha mechanism) (step 304). Either non-synchronized or synchronized RACH can be used for this uplink transmission, which is indicated either through an RRC signaling or by the synchronization request message from the Node-B 352. The Node-B 352 receives the uplink transmission and estimates an uplink timing shift based on the uplink transmission (step 306). The Node-B 352 sends an uplink timing adjustment command to the WTRU 354 (step 308). The WTRU 354 then adjusts uplink timing based on the uplink timing adjustment command (step 310).

The Node-B 352 may include a short, (preferably random), identifier, tag or a sequence number in the uplink synchronization request message, and the WTRU 354 may use the same short identifier, tag or sequence number in the uplink synchronization burst.

The Node-B 352 may designate a frame, a sub-frame or a timeslot in which the uplink synchronization procedure (or random access procedures) should be performed while the WTRU 354 is in an active state. The designated frame, sub-frame or timeslot is different than the frames, sub-frames or timeslots that are used to perform the uplink synchronization procedure (or random access procedures) during the WTRU 354 is in an idle state, (i.e. different than the RACH timeslots). The designation of the frame, sub-frame or timeslot may be performed via prior signaling, (e.g., broadcast messages), or via pre-configuration. The Node-B 352 may provide different service levels or meet the different performance requirements or targets for WTRUs in an active state as opposed to WTRUs in an idle state. When a WTRU 354 is in an active state, in order to support the active traffic, more tightly maintained uplink synchronization is required. Therefore, the WTRU 354 may need to send uplink synchronization transmission more frequently compared to an idle state which requires less tight uplink synchronization since there is no active traffic going on.

In all the above embodiments, the Node-B may include a flag in the polling message, the scheduling message or the synchronization request message to indicate whether it is mandatory or optional that the WTRU performs the procedure for uplink synchronization. Commanding the WTRU to perform uplink synchronization, (i.e., setting the flag to "mandatory"), is useful when the Node-B needs to send packets to the WTRU, (e.g., high speed downlink packet access (HSDPA)), since the WTRU needs to be uplink synchronized in order to send a hybrid automatic repeat request (H-ARQ) positive feedback. Preferably, the flag is included within the polling message, the scheduling message or the synchronization request message. If the flag indicates the uplink synchronization is optional, the WTRU may or may not perform the uplink synchronization procedure.

Figure 4:
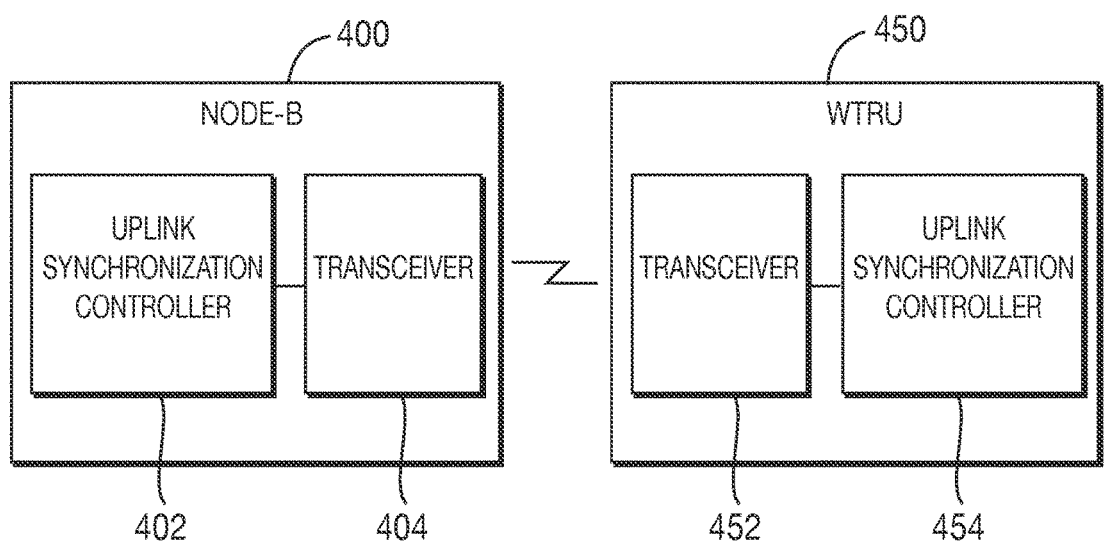
FIG. 4 is a block diagram of a Node-B and a WTRU configured in accordance with the present invention.

FIG. 4 is a block diagram of a Node-B 400 and a WTRU 450 configured in accordance with the present invention. The Node-B 400 includes an uplink synchronization controller 402 and a transceiver 404. The WTRU 450 includes a transceiver 452 and an uplink synchronization controller 454. The uplink synchronization controller 402 generates a polling message, a scheduling message or a synchronization request message for the WTRU 450. The transceiver 404 transmits the polling message, the scheduling message or the synchronization request message to the WTRU 450. The transceiver 452 of the WTRU 450 receives the polling message, the scheduling message or the synchronization request message, and sends an uplink synchronization burst based on the polling message, the scheduling message or the synchronization request message to the Node-B 400.

The uplink synchronization controller 402 estimates an uplink timing shift based on an uplink synchronization burst transmitted by the WTRU 450, and generates an uplink timing adjustment command. The transceiver 404 then sends the uplink timing adjustment command to the WTRU 450. The uplink synchronization controller 454 of the WTRU 450 then adjusts uplink timing based on the uplink timing adjustment command.

In accordance with another embodiment of the present invention, a WTRU may use cell reselection as a trigger to go from a low-power active state to an idle state. When a WTRU, through its cell search and cell reselection procedures, determines that the WTRU should move to a new cell, the WTRU may enter an idle state, instead of performing a handover and radio bearer reconfiguration. In this manner, the WTRU may conserve power by avoiding the control signaling associated with the handover and radio bearer reconfiguration.

In accordance with yet another embodiment of the present invention, a DRX interval, (i.e., the WTRU's wake-up time intervals for reception), may be configured adaptively according to a service level, (i.e., activity of the WTRU). The DRX interval is increased as the period of inactivity of the WTRU increases subject to a predetermined maximum value. The DRX interval may be increased exponentially. Preferably, the network determines the DRX interval and signals it to the WTRU.

Alternatively, the WTRU may inform the Node-B whether the WTRU is currently powered by a battery or a constant power supply, so that the DRX interval is set accordingly. The WTRU may inform the Node-B of its currently remaining battery capacity and other characteristics, (such as consumed power in transmitting data), that may assist the Node-B in computing the estimated battery life. The Node-B then sets up power saving policies, (e.g., DRX interval), for the WTRU based on the information.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method performed by a wireless transmit/receive unit (WTRU), the method comprising:
    receiving discontinuous reception (DRX) control information from a wireless network for DRX operation while the WTRU is operating in an active state, the DRX control information indicating predetermined time intervals that the WTRU checks a physical downlink control channel for an identifier associated with the WTRU;
    entering a DRX mode such that the WTRU periodically wakes up according to the predetermined time intervals to check the physical downlink control channel for the identifier associated with the WTRU;
    receiving at least one polling message on the physical downlink control channel while the WTRU is awake during the predetermined time intervals;
    transmitting an uplink synchronization message based on receiving the polling message; and
    receiving an uplink timing command in response to the uplink synchronization message.

2. A wireless transmit/receive unit (WTRU) comprising:
    a receiver configured to receive discontinuous reception (DRX) control information from a wireless network for DRX operation while the WTRU is operating in an active state, the DRX control information indicating predetermined time intervals that the WTRU checks a physical downlink control channel for an identifier associated with the WTRU;
    circuitry configured to enter a DRX mode such that the WTRU periodically wakes up according to the predetermined time intervals to check the physical downlink control channel for the identifier associated with the WTRU, the receiver further configured to receive at least one polling message on the physical downlink control channel while the WTRU is awake during the predetermined time intervals; and
    a transmitter configured to transmit an uplink synchronization message based on the receiver receiving the polling message, the receiver further configured to receive an uplink timing command in response to the transmitter sending the uplink synchronization message.

3. The method of claim 1, wherein the at least one polling message received on the physical downlink control channel indicates a resource to be used by the WTRU to send the uplink synchronization message.

4. The method of claim 3, wherein the resource includes a subframe to be used by the WTRU to send the uplink synchronization message.

5. The method of claim 3, wherein the uplink synchronization message is transmitted using the resource indicated in the at least one polling message.

6. The method of claim 1, wherein the uplink synchronization message includes a preamble transmitted on a random access channel (RACH).

7. The method of claim 1, further comprising adjusting uplink timing based on the received uplink timing command.

8. The WTRU of claim 2, wherein the at least one polling message received on the physical downlink control channel indicates a resource to be used by the transmitter to send the uplink synchronization message.

9. The WTRU of claim 8, wherein the resource includes a subframe to be used by the transmitter to send the uplink synchronization message.

10. The WTRU of claim 8, wherein the uplink synchronization message is transmitted using the resource indicated in the at least one polling message.

11. The WTRU of claim 2, wherein the uplink synchronization message includes a preamble transmitted on a random access channel (RACH).

12. The WTRU of claim 2, wherein the circuitry is further configured to adjust uplink timing based on the received uplink timing command.

* * * * *